United States Patent Office
3,240,541
Patented Mar. 15, 1966

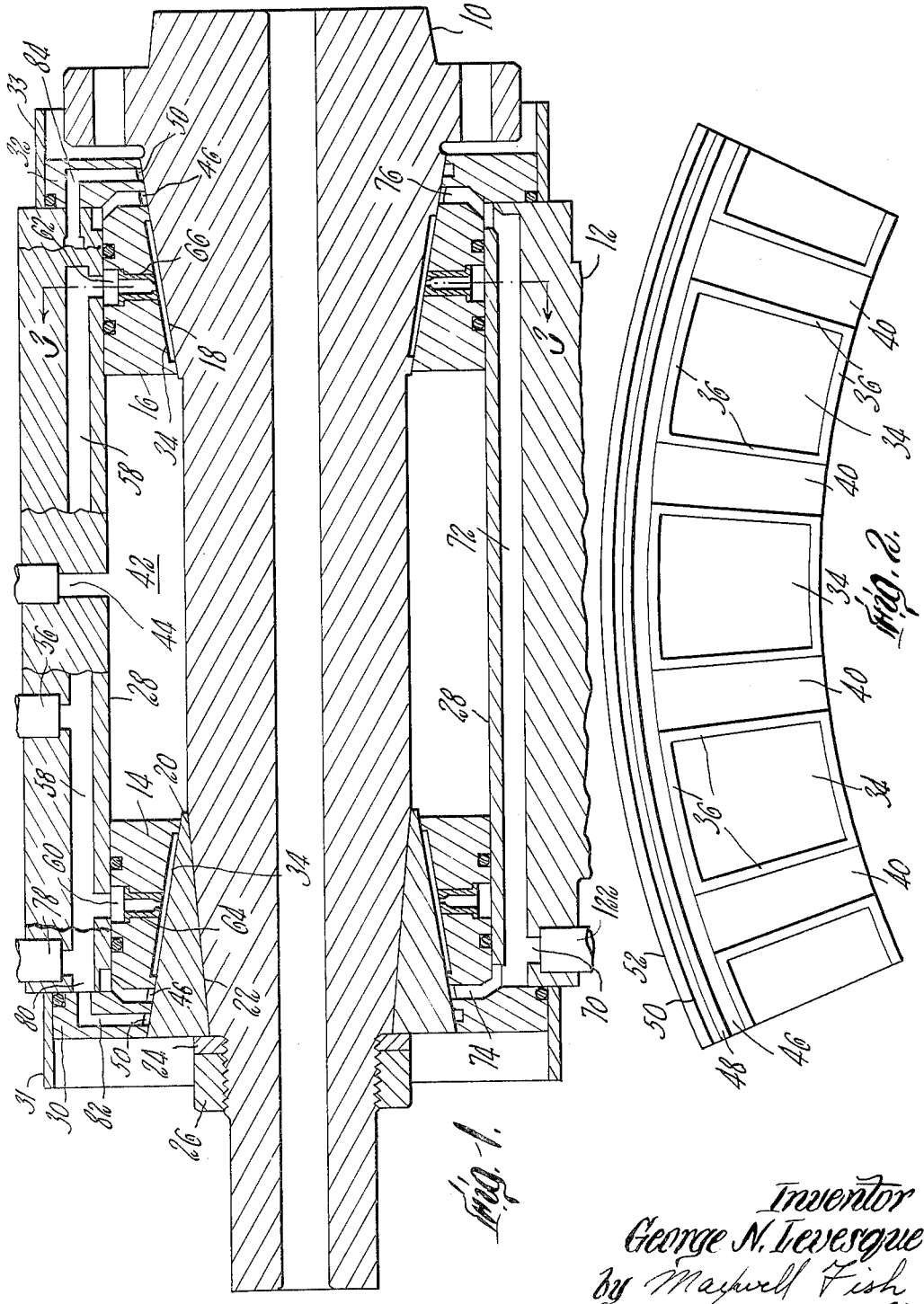

3,240,541
TEMPERATURE CONTROLLED HYDROSTATIC
SPINDLE BEARING
George N. Levesque, Warwick, R.I., assignor to Brown &
Sharpe Mfg. Co., Providence, R.I., a corporation of
Rhode Island
Filed Nov. 27, 1963, Ser. No. 326,538
7 Claims. (Cl. 308—77)

The present invention relates to an end-growth control device for a hydrostatic bearing spindle, and more particularly to a device for controlling the temperature of the bearing and spindle supported thereby for various operating conditions which may be encountered.

Applicant has discovered that a principal source of heat in a hydrostatic bearing which produces endwise growth of the spindle is that produced as energy is lost during the pressure drop which takes place during the flow through the bearing and leakage of excess fluid across the lands defining the edges of the hydrostatic pressure pockets. Rotation of the spindle produces an additional shearing effect upon the fluid passing over the pocket defining lands producing a further heating effect and a further lengthwise expansion or growth of the spindle which is in proportion to the rate of rotation.

It is a principal object of the invention to maintain the temperature conditions within a hydrostatic pocket bearing at a constant level for all conditions of operation and thus to prevent growth of the spindle longitudinally during operation.

More specifically it is an object of the invention to provide a means of drawing off or dissipating heat generated by the drop in pressure of the hydrostatic fluid which escapes between the pocket defining lands and the spindle surface, and by the shearing action upon the hydrostatic fluid caused by the rotation of the spindle relative to the stationary bearing surfaces including said lands.

With these and other objects in view as may hereinafter appear a feature of the invention consists in the construction and arrangement of the hydrostatic pressure pocket bearings which provides for the supply of a coolant to those portions of the hydrostatic bearings immediately adjacent the hydrostatic fluid pressure pocket forming lands to counteract and to dissipate heat which is generated in the hydrostatic bearing during operation of the machine.

More specifically a feature of the invention consists in the provision of a hydrostatic pressure pocket bearing assembly having means for introducing additional fluid as a coolant and at a low pressure into the drainage channels formed in the hydrostatic bearing surfaces immediately adjacent the pocket forming lands, so that the temperature of the hydrostatic bearing assembly and work spindle associated therewith may be maintained at all times at a predetermined constant level.

Another feature of the invention consists in the provision of means to control the quantity of the cooling fluid introduced into said drainage channels dependent on the rate of rotation of the spindle so that the desired temperature level will be maintained for all conditions of operation of the work spindle assembly.

The several features of the invention consist also in the devices, combinations and arrangement of parts hereinafter described and claimed which together with the advantages to be obtained thereby will be readily understood by one skilled in the art from the following description taken in connection with the accompanying drawings, in which:

FIG. 1 is a sectional view of a work spindle mounted in hydrostatic pocket bearings tapered to withstand loads in both radial and axial directions;

FIG. 2 is a developed view of the internal bearing face illustrating the arrangements of the pockets and lands defining several drainage and leak sealing channels associated therewith;

Figures 3, 4:
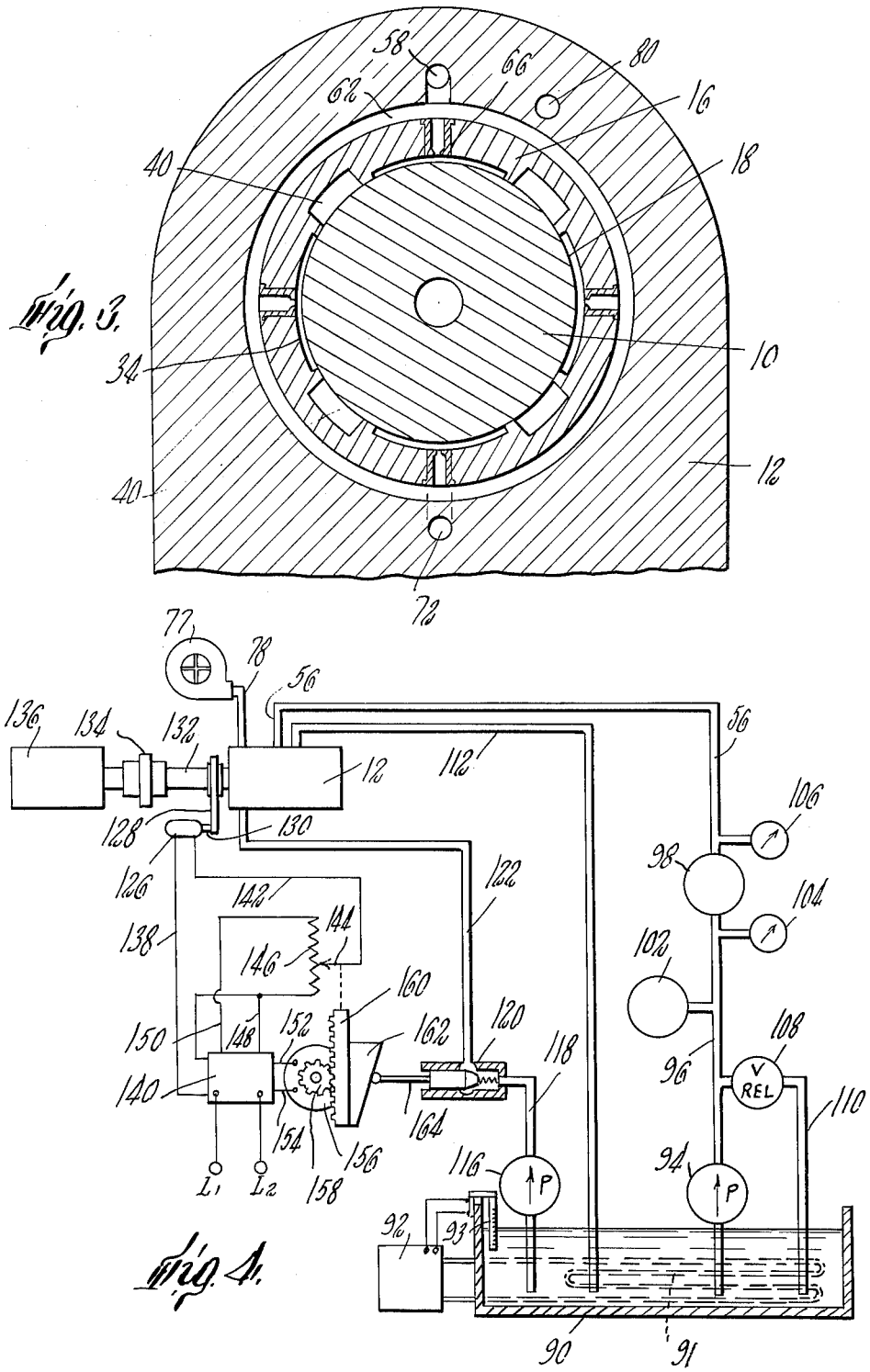
FIG. 3 is a sectional view in elevation taken on a line 3—3 of FIG. 1.
FIG. 4 is a somewhat diagrammatic view of the hydrostatic fluid circulating and coolant control flow system in accordance with the invention.

Referring specifically to the drawings a work spindle 10 is shown mounted in a bearing support generally indicated at 12. In the embodiment shown the spindle 10 is rotatably supported in two opposed tapered bearings 14 and 16 of which the bearing 16 is supported against a tapered surface 18 of the spindle and the bearing 14 engages a tapered sleeve element 20 fixedly supported on the tapered surface 22 of the spindle and held in place thereon by washer 24 and nut 26 screw threaded to an adjacent portion of the spindle. The tapered bearings 14 and 16 are externally supported in a horizontally disposed bore 28 formed in the spindle bearing support 12, being further supported by the engagement of the flanged end portions 30, 32 of said tapered bearings with adjacent end surfaces of the support 12. Sleeves 31, 33 overlying the respective flanges 30, 32 act as oil sling guards. The tapered inner face of each of the hydrostatic pocket bearing members 14 and 16 is formed as shown in the developed view FIG. 2 with four hydrostatic fluid holding pockets 34 spaced around the inner periphery of the bearing member, each being fully enclosed by ridge portions or lands 36 which define the several generally rectangularly shaped pockets. Between each of the pockets 34 there is provided a longitudinally extending drainage channel 40 which at its inner end empties into a cylindrical drainage reservoir 42 having its inner face formed by the peripheral surface of the spindle, its outer face formed by the internal surface of the tubular bore 28, and its ends formed by the inner end faces of the bearing members 14 and 16.

The fluid collected in the drainage reservoir is drawn off therefrom through an outlet 44.

The outer ends of the two bearings 14 and 16 are open, no metal-to-metal friction contact being permitted between the spindle and the supporting bearing surfaces so that the spindle is at all times fully supported by floating contact with the hydrostatic fluid in the pressurized pockets 34 of the bearings. Referring specifically to FIGS. 1 and 2 there is provided outwardly toward the open end of each bearing an annular recess or channel 46 which connects with each of the drainage channels 40 leading to the drainage reservoir 42. The outer edge of the channel 46 is formed by an annular land 48. A second annular groove or recess 50 is provided outwardly of the annular recess 46 and land 48 and is in turn bounded at its outer edge by a circular land 52. The annular recess 50 is connected to receive a supply of a gaseous fluid which may, for example, be air, under pressure, providing an air seal to prevent leakage from the drainage channels 46 of the fluid which has found its way therein from the hydrostatic pressure pockets 34, or which has been supplied directly thereto as a coolant under a low pressure.

As best shown in FIGS. 1 and 3 hydrostatic fluid is supplied to the hydrostatic fluid pressure pockets 34 through an inlet pipe 56 at an initial pressure which may be in the order of 400 p.s.i. The hydrostatic fluid is distributed from said inlet pipe through a longitudinally extending manifold 58 to two annular grooves 60 and 62 formed in the external faces of the respective bearings 14 and 16. Fluid is distributed from the annular groove 60 through throttling devices 64 to each of the hydrostatic pockets 34, said devices being adjusted to reduce the pressure of the hydrostatic fluid in each of the pockets to about 200 p.s.i. The hydrostatic fluid is similarly distributed to each of the pockets 34 in the right hand bearing 16 from the annular groove 62 through throttling devices 66 to the several pockets 34.

The additional fluid provided as a coolant is supplied under suitable pressure into the annular drainage channel 46 associated with each of the two bearings 14 and 16 through connections which comprise an inlet port 70 into a longitudinally extending manifold 72 which is connected at its left hand end as shown in FIG. 1 by a conduit 74 with the annular drainage channel 46 in the left hand bearing 14, and at its right hand end by a conduit 76 with the corresponding annular drainage channel 46 formed in the right hand bearing 16. Air at a suitable pressure is supplied by a pump 77 through an inlet 78 to a manifold 80 extending along the length of the bearing support, and is connected at its left hand end by a conduit 82 with the air seal forming annular groove 50 in the left hand bearing 14, and is similarly connected at its right hand end by a conduit 84 with the air seal forming annular groove 50 in the right hand bearing member 16.

The operating system through which the hydrostatic pressure fluid is supplied to the hydrostatic bearings 14, 16 comprises a reservoir 90 having refrigerating pipes 91 supplied by a refrigerating unit 92 controlled by a thermometer 93 immersed in the reservoir 90. From the reservoir 90 the hydrostatic fluid is drawn upwardly through a pump 94, thence passing through a pipe 96, filter 98 and the inlet pipe 56 above referred to. The system includes further a hydraulic accumulator 102 to avoid pulsations in the bearing supply pressure, two pressure gages 104, 106 and an overload relief valve 108 by means of which excess pressure is bypassed through a return pipe 110 to the reservoir. A hydrostatic fluid return pipe 112 connects the outlet 44 from the drainage reservoir 42 with the reservoir 90.

A second pump and connections from the fluid supply reservoir 90 are provided for supplying additional pressure fluid under a relatively low pressure as a cooling medium into the drainage system and more specifically into the drainage channels immediately surrounding the hydrostatic pressure pockets 34. These connections comprise the pump 116 through which the chilled pressure fluid is pumped through a pipe 118, a regulating valve 120, and a connecting pipe 122 to the inlet 70 through which the refrigerant cooling medium is passed by way of the manifold 72 and pipes 74, 76 to the respective annular drainage recesses 46.

In accordance with the invention a mechanism is provided for adjusting automatically the amount of the chilled pressure fluid which is delivered to the annular drainage recesses 46 so that the amount of such fluid delivered will be dependent on the rate of rotation of the spindle. The arrangement provided comprises a tachometer generator 126 which is driven by means of a belt 128 which passes around a pulley on the tachometer drive shaft 130 and around a pulley on a drive shaft 132 for the work spindle 10. The shaft 132 is driven through a coupling 134 from a variable speed motor drive generally designated at 136. As shown in the diagrammatic FIG. 4 the tachometer generator 126 is connected by a wire 138 with a servo amplifier 140. A second connection from the tachometer generator 142 is connected with the movable arm 144 of a potentiometer 146 from which two separate leads 148, 150 connect with the servo amplifier. Two leads 152, 154 from the servo amplifier are connected to a servo motor 156 which drives a pinion 158 connected to a vertically shiftable rack 160. The rack 160 is mechanically connected to the movable arm 144 of the potentiometer and also carries a cam 162 which acts through a follower 164 to control the position of the adjustable valve 120 which controls the rate at which the chilled pressure fluid is supplied to the annular drainage recesses 46. The servo amplifier 140 is connected with a power source by means of two leads identified as $L_1$ and $L_2$.

The apparatus above described operates in the following manner:

In order to put the machine in condition for operation the pump 94 must be started so that the hydrostatic pressure medium is supplied to the pockets 34 of the work spindle bearings 14, 16. The pump 116 is also operating, causing pressure fluid to be supplied at a low pressure to the regulating valve 120. It has been noted that the hydrostatic fluid is supplied to the bearing at a pressure of approximately 400 p.s.i. The fluid which flows through the pressure reducing elements to the hydrostatic pressure pockets 34 is throttled to about one-half pressure or approximately 200 p.s.i. As the fluid escapes across the lands 36 defining the edges of the pockets into the drainage channels, pressure is reduced to nearly atmospheric pressure. The loss of energy represented by this pressure drop is accompanied by a rise in temperature of the fluid. For the assumed 400 p.s.i., and with oil as a fluid, the fluid is heated approximately 2.4° F. To have the work head operate at room temperature when not rotating, it is only necessary to maintain this supply fluid at 2.4° F. below room temperature. The refrigerating system above referred to including the pipes 91 is set to produce this temperature differential. Additional leakage of the hydrostatic pressure fluid across the lands 36 takes place when the spindle 10 is rotated due to the shearing of the fluid film at the bearing and seal lands. The amount of such heat generation due to the spindle rotation increases as the speed of rotation is increased. In the example shown the heat generated increases in proportion to the square of the spindle speed.

When the spindle is not operating the rack 160 and cam 162 for controlling the amount of coolant fluid supplied will be in the fully lowered position in which the follower 164 of the control valve 120 is moved to the right closing the valve. Rotation of the tachometer generator gives a voltage signal dependent on the rate of rotation. The difference between the tachometer voltage and the potentiometer voltage controlled by the position of the potentiometer arm 144 is fed to the servo amplifier 140 whose output drives the servo motor 156 in a direction to move the rack 160 upwardly carrying with it the cam 162 and movable potentiometer arm 144. The reference voltage to the servo amplifier through the potentiometer is increased until it just equals the tachometer voltage whereupon the servo motor 156 stops. At the same time that the potentiometer arm 144 is being moved upwardly cam 162 rises permitting the follower 164 of valve 120 to be moved to the left under the pressure of its spring causing an increasing amount of the cooling fluid to be fed into the drainage channels 46 of the hydrostatic pocket bearings. The positions of the potentiometer arm 144 and the cam 162 with relation to each other and with relation to the rack 160 are adjustably determined so that for any given speed of rotation of the work spindle the opening of the cooling fluid control valve follower 164 will be just sufficient to supply the necessary coolant to maintain the temperature within the bearing and the temperature of the work spindle at a substantially constant level.

Figure 5:
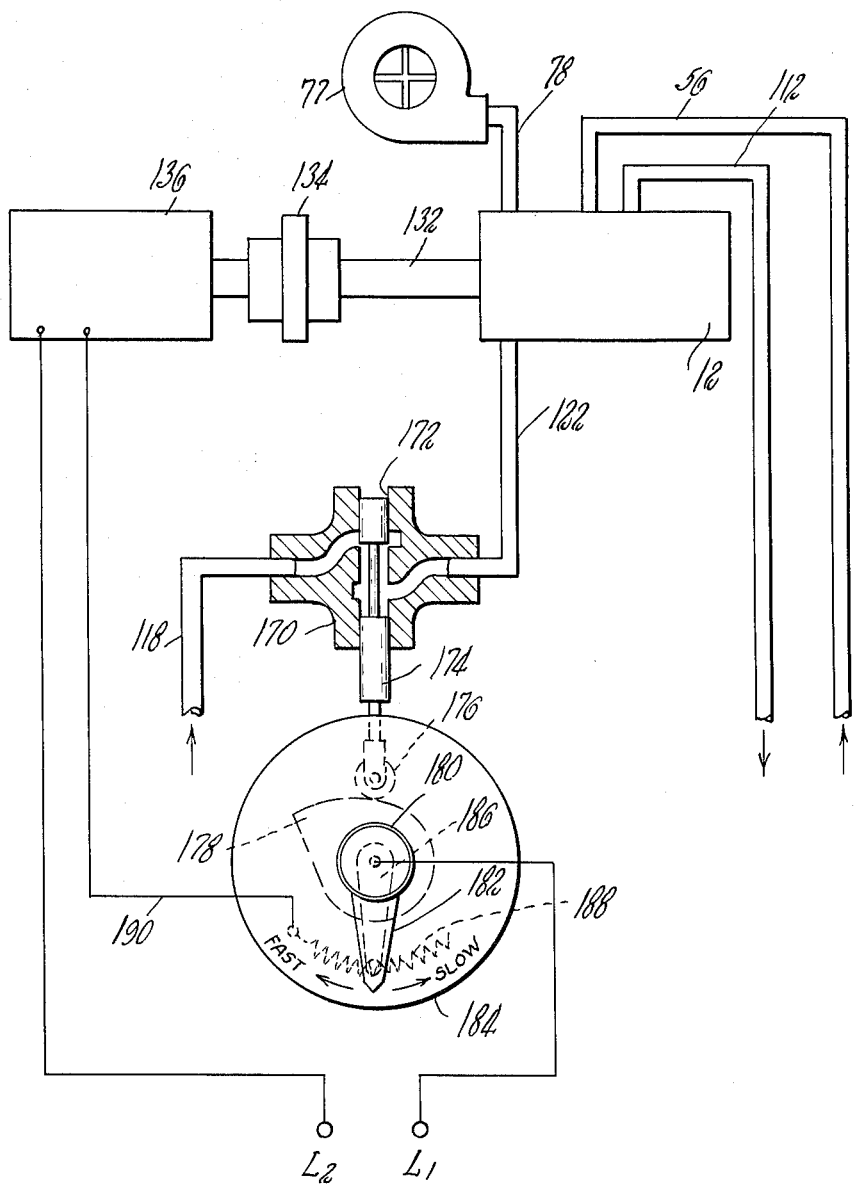
FIG. 5 is a digrammatic view showing a modification of applicant's hydrostatic fluid circulating and coolant control system in accordance with the invention, in which a manual controller is provided for changing both motor speed and coolant flow.

FIG. 5 of the drawings illustrates a modified form of applicant's coolant flow control system in which a manually operable device is provided for changing the motor speed and for changing the coolant flow by an amount dependent on the spindle speed in order to maintain constant the temperature conditions within the hydrostatic bearing.

The hydrostatic bearing assembly and motor drive therefore are assumed to be identical with those illustrated in FIGS. 1–5, inclusive. High pressure fluid is supplied to the bearing through conduit 56, fluid is exhausted at substantially the atmospheric pressure through pipe 112, and additional cooling fluid is supplied to the bearing through coolant fluid supply pipe 122. The spindle bearing support is generally designated at 12 and the spindle is driven at variable rates through a spindle drive shaft 132, coupling 134 and variable speed motor unit 136. In the alternative construction of FIG. 5 a fluid flow control valve 170 is connected into pipe 122 through which additional coolant at low pressure is supplied to the spindle bearing unit 12. The valve specifically is formed with a transverse bore 172 having inlet and outlet ports spaced from one another lengthwise of the bore, and a valve member 174 axially shiftable in the bore between a retracted closed position and an extended open position. At its lower end the valve member 174 is provided with a follower 176 which rides on the surface of a disc cam 178 secured to a rotary manual control shaft 180. A manually operable controller knob is fitted to the outer end of the shaft 180. A downwardly extending pointer arm 182 secured to the controller shaft provides a pointer rotatable with the control shaft between fast and slow positions indicated on a dial 184. The pointer 182 also forms the movable element of a rheostat 186 which cooperates with an underlying resistance coil 188 to control the rate of rotation of the spindle motor 136. The electrical connections for controlling the motor include a power line $L_1$ which is connected with the movable element 186 of the rheostat, a lead 190 connected between the coil 188 of the rheostat and the motor 136, and a second power line $L_2$ connected with the motor 136. In this form of the device the rate of speed of the spindle, and the rate of flow of the coolant are both controlled manually and in unison. It will be understood that the cam 178 is shaped and calibrated to supply an amount of coolant which will exactly offset any tendency to temperature variation for any rotational speed of the spindle throughout the range of movement of the manual controller.

It will be understood that while in the preferred embodiment of the invention the same hydrostatic fluid which is supplied to the hydrostatic pressure pockets 34 is also pumped from a common reservoir into the drainage channels 46 at low pressure as a coolant, it is contemplated, if so desired, that a different fluid supplied from a different source may be pumped into the drainage channels to overcome the heating effect produced by the spindle rotation.

The invention having been described what is claimed is:

1. A temperature controlled hydrostatic bearing for a spindle adapted to be driven at different rates having, in combination, a spindle supporting bearing surface having formed therein hydrostatic fluid pressure supporting pockets spaced from one another about said bearing surface, pocket forming lands enclosing each said pocket, drainage channels formed in said bearing surface outwardly of said pocket forming lands for drawing off hydrostatic fluid escaping across said lands, a hydrostatic fluid pressure circulating system comprising supply connections through which hydrostatic fluid is supplied under pressure to said pockets, separate supply connections through which additional cooling fluid is supplied to said drainage channels, and means for precooling the fluid supplied to each of said pockets and drainage channels.

2. A temperature controlled hydrostatic bearing for a spindle adapted to be driven at different rates having, in combination, a spindle supporting bearing surface having formed therein hydrostatic fluid pressure supporting pockets spaced from one another about said bearing surface, pocket forming lands enclosing each said pocket, drainage channels formed in said bearing surface outwardly of said pocket forming lands for drawing off hydrostatic fluid escaping across said lands, a hydrostatic fluid pressure circulating system comprising supply connections through which hydrostatic fluid is supplied under pressure to said pockets, separate supply connections through which additional cooling fluid is supplied to said drainage channels, means for precooling the fluid supplied to each of said pockets and drainage channels, control means for increasing the rate of rotation of the spindle, means to vary the flow of said additional cooling fluid, and means to increase the flow of said additional cooling fluid as the spindle speed is increased.

3. A temperature controlled hydrostatic bearing for a spindle adapted to be driven at different rates having, in combination, a spindle supporting bearing surface having formed therein hydrostatic fluid pressure supporting pockets spaced from one another about said bearing surface, pocket forming lands enclosing each said pocket, drainage channels formed in said bearing surface outwardly of said pocket forming lands for drawing off hydrostatic fluid escaping across said lands, a hydrostatic fluid pressure circulating system comprising supply connections through which hydrostatic fluid is supplied under pressure to said pockets, separate supply connections through which fluid is supplied to said drainage channels, means for precooling the fluid supplied to each of said pockets and drainage channels, a device connected with said spindle for imparting a signal indicating the rate of rotation of said spindle, and means actuated by said signal for controlling the supply of cooled fluid to said drainage channels to increase the cooling effect thereof by an amount which is dependent upon the increase in rate of rotation of the spindle.

4. A temperature controlled hydrostatic bearing for a spindle adapted to be driven at different rates having, in combination, a spindle supporting bearing surface having formed therein hydrostatic pressure supporting pockets spaced from one another about said bearing surface, pocket forming lands enclosing each said pocket, drainage channels disposed outwardly of said pocket forming lands for drawing off hydrostatic fluid escaping across said lands, a hydrostatic fluid pressure circulating system comprising a reservoir, connections for supplying hydrostatic fluid from said reservoir at a substantial pressure to said pockets, connections for supplying fluid from said reservoir at a low pressure to said drainage channels, including a flow control valve shiftable between closed and open positions, means for drawing off fluid through said drainage channels back to said reservoir, means for precooling said pressure fluid in said reservoir by a predetermined amount, a speed measuring device connected with said spindle and a control device actuated by said speed measuring device for opening said valve by an amount which is related to an increase in the rate of operation of the spindle.

5. A temprature controlled hydrostatic bearing for a spindle adapted to be driven at different rates having, in combination, a spindle supporting bearing surface having formed therein hydrostatic fluid pressure supporting pockets spaced from one another about said bearing surface, pocket forming lands enclosing each said pocket, drainage channels formed in said bearing surface outwardly of said pocket forming lands for drawing off hydrostatic fluid escaping across said lands, a hydrostatic fluid pressure circulating system comprising supply connections through which hydrostatic fluid is supplied under pressure to said pockets, separate supply connections through which fluid is supplied as a coolant at low pressure to said drainage channels including a variable flow control valve, and control means for said valve comprising means actuated by said spindle for producing a signal of a strength which depends upon the rate of rotation of said spindle, and signal receiving means connected to said valve for opening the valve to an extent which is dependent upon the strength of said signal.

6. A temperature controlled hydrostatic bearing for a spindle adapted to be driven at different rates having, in combination, an open ended spindle supporting bearing surface having formed therein hydrostatic fluid pressure supporting pockets spaced from one another about said bearing surface, pocket forming lands enclosing each said pocket, drainage channels formed in said bearing surface outwardly of said pocket forming lands for drawing off hydrostatic fluid escaping across said lands, a fluid containing sealing channel formed in said bearing surface outwardly of said drainage channels toward the open end of said bearing, a land separating said drainage and sealing channels and a land defining the outer edge of said sealing channel, a hydrostatic fluid pressure circulating system comprising supply connections through which hydrostatic fluid is supplied under pressure to said pockets, separate supply connections through which fluid is supplied to said drainage channels, means for precooling the fluid supplied to each of said pockets and drainage channels, and an exhaust connection from said drainage channels for fluid deposited therein, a spindle speed measuring device, means responsive to the indication of said spindle speed measuring device for controlling the admission of said precooled fluid to said drainage channels in amounts dependent upon the rate of spindle rotation, and means for supplying air under pressure to said sealing channel.

7. A temperature controlled hydrostatic bearing for a spindle adapted to be driven at different rates having, in combination, a spindle supporting bearing surface having formed therein hydrostatic fluid pressure supporting pockets spaced from one another about said bearing surface, pocket forming lands enclosing each said pocket, drainage channels formed in said bearing surface outwardly of said pocket forming lands for drawing off hydrostatic fluid escaping across said lands, a hydrostatic fluid pressure circulating system comprising supply connections through which hydrostatic fluid is supplied under pressure to said pockets, separate supply connections through which additional cooling fluid is supplied to said drainage channels, means for precooling the fluid supplied to each of said pockets and drainage channels, a controller shiftable to vary the rate of rotation of the spindle, a flow valve in said separate supply conections, and cam means connected with said controller to effect a related variation in the position of said flow valve to maintain constant the temperature of said bearing.

References Cited by the Examiner
UNITED STATES PATENTS

| | | | |
|---|---|---|---|
| 1,191,188 | 7/1916 | Julien | 308—76 |
| 2,389,687 | 11/1945 | Rickenmann | 308 |
| 2,660,484 | 11/1953 | Gerard et al. | 308—122 X |

DON A. WAITE, *Primary Examiner.*

FRANK SUSKO, *Examiner.*